US012633215B2

(12) United States Patent     (10) Patent No.:   US 12,633,215 B2

Hellgren et al.     (45) Date of Patent:    May 19, 2026

(54) TRAFFIC PLANNING METHOD FOR A VEHICLE FLEET

(71) Applicant: Volvo Autonomous Solutions AB, Gothenburg (SE)

(72) Inventors: Jonas Hellgren, Gothenburg (SE); Stefan Kojchev, Mölndal (SE)

(73) Assignee: Volvo Autonomous Solutions AB, Gothenburg (SE)

( * ) Notice: Subject to any disclaimer, the term of this patent is extended or adjusted under 35 U.S.C. 154(b) by 110 days.

(21) Appl. No.: 18/659,534

(22) Filed: May 9, 2024

(65) Prior Publication Data

US 2024/0379000 A1     Nov. 14, 2024

(30) Foreign Application Priority Data

May 12, 2023    (EP) ..................................... 23173049

(51) Int. Cl.
*G08G 1/0968*     (2006.01)
*B60W 60/00*     (2020.01)
(52) U.S. Cl.
CPC ..... *G08G 1/096811* (2013.01); *B60W 60/001* (2020.02); *B60W 2300/10* (2013.01); *B60W 2300/12* (2013.01); *B60W 2300/17* (2013.01)
(58) Field of Classification Search
CPC ......... G08G 1/096811; B60W 60/001; B60W 2300/10; B60W 2300/12; B60W 2300/17; G05D 1/229; G05D 1/6987
See application file for complete search history.

(56) References Cited

U.S. PATENT DOCUMENTS

| | | | |
|---|---|---|---|
| 6,950,788 B2 * | 9/2005 | Faghri | ...................... G08G 1/00 703/2 |
| 11,423,300 B1 * | 8/2022 | Ritter | ...................... G06N 3/006 |

(Continued)

FOREIGN PATENT DOCUMENTS

| | | |
|---|---|---|
| CN | 112319461 A | 2/2021 |
| EP | 3025206 B1 | 9/2017 |

(Continued)

OTHER PUBLICATIONS

Extended European Search Report in corresponding European Application No. 23173049.0 dated Apr. 9, 2024 (17 pages).

(Continued)

*Primary Examiner* — Redhwan K Mawari

(74) *Attorney, Agent, or Firm* — Jeffri A. Kaminski; Venable LLP

(57) ABSTRACT

A computer-implemented traffic planning method controls a plurality of vehicles which are movable among multiple shared resources. The method includes receiving a transport mission; generating a root node representing an initial resource occupancy of the vehicles; generating a search tree from the root node, in which each edge represents a motion command and each node represents a resource occupancy, wherein each node is associated with a score related to the vehicles' fulfilment of the transport mission; identifying a target node with an acceptable score; and deriving a planned sequence of motion commands corresponding to a path to the target node. The score of a node includes a short-term component, which represents a cost of executing all motion commands from the root node to said node, and a long-term component, which is determined by the resource occupancy that the node represents.

15 Claims, 5 Drawing Sheets

(56) References Cited

U.S. PATENT DOCUMENTS

| | | | | |
|---|---|---|---|---|
| 11,430,181 B1* | 8/2022 | Jotwani | | G06F 18/24 |
| 11,443,260 B1* | 9/2022 | van Breen | | G08G 1/095 |
| 11,460,580 B2* | 10/2022 | Schroeter | | G06F 16/2246 |
| 11,462,034 B2* | 10/2022 | van den Oord | | H04N 19/50 |
| 11,710,276 B1* | 7/2023 | Kovacs | | G06F 3/0486 |
| | | | | 345/419 |
| 2005/0216147 A1* | 9/2005 | Ferman | | G08G 1/0104 |
| | | | | 701/409 |
| 2007/0011850 A1 | 1/2007 | Downing et al. | | |
| 2010/0312466 A1 | 12/2010 | Katzer et al. | | |
| 2020/0040189 A1 | 2/2020 | Choi et al. | | |
| 2020/0193838 A1* | 6/2020 | Yoo | | G08G 1/0112 |
| 2020/0219049 A1* | 7/2020 | Li | | G01C 21/3446 |
| 2020/0363800 A1* | 11/2020 | Jojo-Verge | | B60W 60/0011 |
| 2021/0116261 A1* | 4/2021 | Guim Bernat | | G08G 1/09 |
| 2021/0146919 A1 | 5/2021 | Xu et al. | | |
| 2022/0036302 A1* | 2/2022 | Cella | | G05B 13/0265 |
| 2022/0156665 A1* | 5/2022 | Beth | | G05D 1/0276 |
| 2022/0215326 A1* | 7/2022 | Bever | | G06Q 10/101 |
| 2022/0250641 A1 | 8/2022 | Seegmiller et al. | | |
| 2022/0274590 A1* | 9/2022 | Morikuni | | B60W 30/09 |
| 2022/0295317 A1* | 9/2022 | Challita | | H04W 16/28 |
| 2022/0355483 A1* | 11/2022 | Lee | | B25J 9/1666 |
| 2022/0366247 A1* | 11/2022 | Hamrick | | G06N 3/092 |
| 2022/0383740 A1* | 12/2022 | Hellgren | | G08G 1/202 |
| 2023/0083586 A1 | 3/2023 | Hellgren | | |
| 2023/0146697 A1* | 5/2023 | Menard | | G08G 1/0112 |
| | | | | 340/910 |

FOREIGN PATENT DOCUMENTS

| | | | |
|---|---|---|---|
| EP | 4095640 A1 | 11/2022 | |
| EP | 4113241 A1 | 1/2023 | |

OTHER PUBLICATIONS

Extended European Search Report in corresponding European Application No. 23173047.4 dated Apr. 2, 2024 (18 pages).

David Silver et al; "Sample-Based Learning and Search with Permanent and Transient Memories"; Proceedings of the 25th International Conference on Machine Learning, ICML '08, ACM Press, New York, New York, USA; Jul. 5, 2008; pp. 968-975; XP058106412; DOI: 10.1145/1390156.1390278; ISBN: 978-1-60558-205-4; 8 pages.

Sylvain Gelly et al; "Monte-Carlo tree search and rapid action value estimation in computer Go"; Artificial Intelligence, Elsevier Science Publisher B.V., Amsterdam, NL; vol. 175, No. 11; Mar. 30, 2011; pp. 1856-1875, XP028374616; ISSN: 0004-3702, DOI: 10.1016/J.ARTINT.2011.03.007; 20 pages.

Max Magnuson; "Monte Carlo Tree Search and Its Applications"; Scholarly Horizons: University of Minnesota, Morris Undergraduate Journal, vol. 2, No. 2; Sep. 2, 2015; XP093143745; ISSN: 2576-2176, DOI: 10.61366/2576-2176.1028; Retrieved from the Internet: URL: https://digitalcommons.morris.umn.edu/cgi/viewcontent.cgi?article=1028&context=horizons; 7 pages.

Sridhar Sabarish; "Selection of features for ML based Commanding of Autonomous Vehicles"; KTH Royal Institute of Technology School of Electrical Engineering and Computer Science; Oct. 28, 2020; pp. 1-65; XP093143307; Retrieved from the Internet: URL: https://www.diva-portal.org/smash/get/diva2: 1508399/FULLTEXT01.pdf; 65 pages.

Marcus Remgård et al; "Towards artificially playing the game of double pong Combining learning and search algorithms Master's thesis in Physics"; Jun. 1, 2022; XP093143486; Retrieved from the Internet: URL: https://odr.chalmers.se/server/api/core/bitstreams/dc6ald25-6d46-425c-9106-e8dc394dffd8/content; 69 pages.

* cited by examiner

TRAFFIC PLANNING METHOD FOR A VEHICLE FLEET

TECHNICAL FIELD

The present disclosure relates to the field of centralized vehicle control, and in particular to methods and devices allowing centralized control of a scalable number of vehicles using limited computational resources. The teachings in the disclosure can be applied to heavy-duty vehicles, such as trucks, buses, and construction equipment, among other vehicle types.

BACKGROUND

A fleet of autonomous vehicles can be controlled in a distributed (individual) or in a centralized (groupwise) fashion. Centralized control may be advantageous when the vehicles are to operate in a closed environment, especially when space is limited, and/or when the vehicles are carrying out a common utility task. Under the centralized control paradigm, tactical decisions, with a typical horizon of the order of minutes, are entrusted to a so-called traffic planner. The traffic planner reads current vehicle positions and other relevant state variables of the traffic system and determines commands to be given to each vehicle at times within a planning horizon. The traffic planner may be instructed to determine the commands with a view to maximizing productivity and/or minimizing cost, and the fleet owner can express the desired balance between these goals by configuring weighting coefficients. Decision-making on a shorter timescale than the tactical one, including vehicle stabilization and collision avoidance, may be delegated to each vehicle.

The applicant's earlier disclosure EP4113241A1 relates to a traffic planning method for a similar setup. In that method, initial node occupancies of the vehicles are obtained, and a sequence of motion commands are determined by optimizing a state-action value function Q(s, a) which depends on node occupancies s and the motion commands a to be given. The state-action value function includes a command-dependent term $Q_S(s, a)$, which is updated in each iteration based on a reward function, and a command-independent term $Q_L(s)$, which penalizes node occupancies with too small inter-vehicle gaps and is exempted from said updating. The nodes may correspond to shared resources, such as road segments, intersections, service and parking areas.

The transition from combustion engines to battery-electric vehicle propulsion brings with it a need to cope with the relatively more frequent recharging intervals and the relatively lengthier recharging cycles. Further, as a result of the capital cost of very large batteries and other economic realities, battery-electric vehicles may be expected to operate close to the totally discharged condition much more often than conventional vehicles. Mastering this relatively frequent near-flat condition may be an important success factor for centralized control of a fleet of autonomous battery-electric vehicles.

SUMMARY

One objective of the present disclosure is to make available a traffic planning method that is well suited for controlling a plurality of battery-electric vehicles. The traffic planning method is to fulfil conventional aims, such as the minimization of standstill time, the avoidance of deadlock states, and the optimization of the productivity-to-cost ratio.

A further objective is to use the vehicle's battery capacity fully, without applying an excessive safety margin above the run-flat condition. A further objective is to provide a traffic planner that can be implemented with a limited amount of processing power. A still further objective is to make available a computer system with these or corresponding characteristics.

In a first aspect of the present disclosure, there is provided a computer-implemented traffic planning method for controlling a plurality of vehicles which are movable among multiple shared resources in accordance with predefined motion commands. It is assumed that a vehicle is allowed to move from a first resource to a second resource if the first resource is connected to the second resource and the second resource is not occupied. The method comprises the following steps to be performed by processing circuitry of a computer system: receiving (e.g., from an operator or a system owner) a transport mission to be carried out by the vehicles; generating a root node representing an initial resource occupancy of the vehicles; generating a search tree from the root node, in which each edge represents a motion command and each node represents a resource occupancy, wherein each node is associated with a score related to the vehicles' fulfilment of the transport mission; identifying, among the nodes of the search tree, a target node with an acceptable score; and deriving a planned sequence of motion commands corresponding to a path from the root node to the target node. According to said first aspect, the score of a node includes a short-term component, which represents a cost of executing all motion commands from the root node to said node, and a long-term component, which is determined by the resource occupancy that the node represents.

Because the long-term component can be pre-computed, e.g. in an initial scoring phase, a technical benefit may include that the traffic planning method is capable of consistent and foresightful vehicle control while consuming a moderate amount of processing resources. In particular, the traffic planning method can achieve good results while keeping the number of nodes in the search tree reasonable, it being hypothesized that the influence of the long-term component discourages or stops the search trees from being extended into directions that are likely unfruitful in the end. Further, because the battery-energy level of the vehicles can be included in the long-term component and computed during a foregoing evaluation of simulated or real vehicle movements, this traffic planning method addresses the run-flat concern which is specific to battery-electric vehicles, as explained above.

Optionally in some examples, including in at least one preferred example, the search tree may be generated by assigning a score to a newly generated node in the search tree by computing a value of the short-term component and reading a value of the long-term component from a memory. The memory may, in some examples, have been populated with values of the long-term component by evaluating movements of the vehicles, and this may have occurred during an initial scoring phase.

The memory can be a trainable model, such as a feedforward neural network. As used in this disclosure, the term "trainable model" may be synonymous to—or overlap in meaning with—the terms machine-learning model and artificial-intelligence model.

On the one hand, the evaluated movements of the vehicles may be simulated movements, in particular computer-simulated movements, which are driven by random samples or which are rule-based.

On the other hand, the evaluated movements of the vehicles may be observed real-world movements.

The movements of the vehicles may be evaluated with respect to fulfilment of the transport mission, e.g., a percentage to which the transport mission has been completed. Further, the transport mission may be formulated as an open mission (e.g., keep moving items from a loading station to an unloading station), in which case the movements may be evaluated by an accumulating score, which represents the amount of useful transportation work that has been carried out (e.g., the number of successfully moved items).

Alternatively or additionally, the movements of the vehicles may be evaluated with respect to expected battery energy levels of the vehicles. During the scoring phase, for example, a large number of driving situations can be simulated while recording the battery levels of all vehicles involved. Thus, basing the long-term component on the battery-energy level in the traffic planning method may help avoid planning outcomes where vehicles are sent to such locations where they are known to be at a high risk of running flat on battery, in particular remote or elevated locations.

Alternatively or additionally, the movements of the vehicles may be evaluated with respect to an expected total standstill time of the vehicles. The long-term component may be inversely related to the total standstill time as this generally indicates poor planning efficiency and/or congestion of a traffic system. A benefit may include that planning outcomes with significant standstill time are penalized and thus avoided at an early stage by the traffic planning method.

Optionally in some examples, including in at least one preferred example, the score of a node further includes a short-term component that represents the vehicles' fulfilment of the transport mission. This option is useful for transport missions of the open type (e.g., circulate the vehicles on a predefined road loop that includes a loading station and an unloading station), in which a vehicle entering a certain resource corresponds—almost certainly—to a unit of completed productive transportation work. For closed transport missions and generally speaking more complex transport missions, an implementer of the traffic control method may prefer to encode the transport mission into the long-term component, e.g. for performance or accuracy reasons.

Optionally in some examples, including in at least one preferred example, the acceptable score of the identified target node is a maximal score in the search tree.

Optionally in some examples, including in at least one preferred example, the acceptable score of the identified target node is a score which exceeds a predefined score threshold.

Optionally in some examples, including in at least one preferred example, the vehicles are autonomous vehicles.

In a second aspect of the present disclosure, there is provided a computer system comprising processing circuitry configured to control a plurality of vehicles, which are movable among multiple shared resources in accordance with predefined motion commands. It is assumed that a vehicle shall be allowed to move from a first resource to a second resource if the first resource is connected to the second resource and the second resource is not occupied. The computer system is configured to: receive a transport mission to be carried out by the vehicles; generate a root node representing an initial resource occupancy of the vehicles; generate a search tree from the root node, in which each edge represents a motion command and each node represents a resource occupancy, wherein each node is associated with a score related to the vehicles' fulfilment of the transport mission; identify, among the nodes of the search tree, a target node with an acceptable score; and derive a planned sequence of motion commands corresponding to a path from the root node to the target node. According to the second aspect, the score of a node includes a short-term component, which represents a cost of executing all motion commands from the root node to said node, and a long-term component, which is determined by the resource occupancy that the node represents.

The computer system according to the second aspect generally shares the benefits and advantages of the method according to the second aspect, and it can be implemented with a corresponding degree of technical variation.

Optionally in some examples, including in at least one preferred example, the computer system according to the second aspect further comprises a memory suitable for storing the long-term component of the score. The memory can be a trainable model in the sense explained above.

This disclosure further provides a vehicle comprising the computer system of the second aspect.

This disclosure further provides a computer program or a computer program product comprising program code for performing the method of the first aspect when the program code is executed by processing circuitry. The computer program may be stored or distributed on a data carrier. As used herein, a "data carrier" may be a transitory data carrier, such as modulated electromagnetic or optical waves, or a non-transitory data carrier. Non-transitory data carriers include volatile and non-volatile memories, such as permanent and non-permanent storage media of magnetic, optical or solid-state type. Still within the scope of "data carrier", such memories may be fixedly mounted or portable.

Generally, all terms used in the claims are to be interpreted according to their ordinary meaning in the technical field, unless explicitly defined otherwise herein.

The disclosed aspects, examples (including any preferred examples), and/or accompanying claims may be suitably combined with each other as would be apparent to anyone of ordinary skill in the art. Additional features and advantages are disclosed in the following description, claims, and drawings, and in part will be readily apparent therefrom to those skilled in the art or recognized by practicing the disclosure as described herein.

BRIEF DESCRIPTION OF THE DRAWINGS

Aspects and embodiments are now described, by way of example, with reference to the accompanying drawings, on which.

DETAILED DESCRIPTION

The detailed description set forth below provides information and examples of the disclosed technology with sufficient detail to enable those skilled in the art to practice the disclosure.

System Overview

Figure 3:
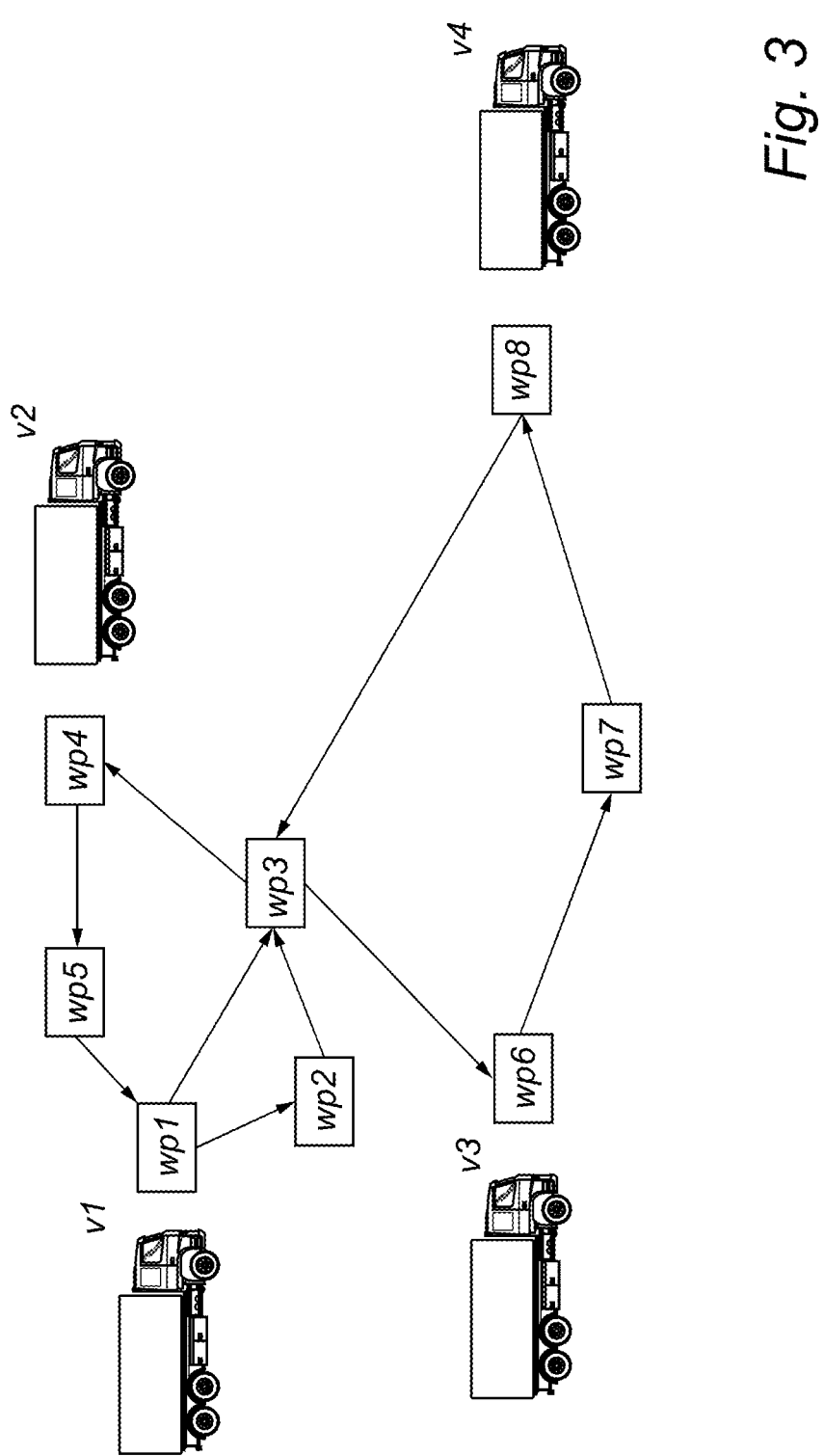
FIG. 3 is a schematical representation of a road network with numbered waypoints that are modeled as shared resources in the traffic planning method.

FIG. 3 is a schematic representation of a road network. For the purpose of traffic planning, a number of waypoints have been defined, including at road junctions wp1, wp3 and at some intermediate locations wp2, wp4, wp5, . . . , wp8. Some of the intermediate locations may be road segments, and others may correspond to so-called absorption nodes, where a visiting vehicle is required to dwell for a predetermined or variable time, for purposes of loading, unloading, maintenance etc. The arrangement of the waypoints is not essential to the present invention, rather their locations and number may be chosen (defined) as deemed necessary in each use case to achieve smooth and efficient traffic planning. The waypoints are treated as resources which are shared by a plurality of vehicles v1, v2, v3, v4. Abstractly, a resource may be understood as a logical entity which is either free or occupied by exactly one vehicle at a time. Resources may represent physical space for transport or parking, a communication channel, maintenance machinery, additional equipment for optional temporary use, such as tools or trailers. An occupied resource is not consumed but can be released for use by the same or another vehicle.

The traffic planning method to be described below observes a rule that a vehicle shall be allowed to move from a first resource to a second resource if the first resource is connected to the second resource and the second resource is not occupied. The connections may be modelled as unidirectional or bidirectional edges in a graph representing the road network. Under the former option, as exemplified by FIG. 3, a bidirectional road section between two waypoints can be modelled as two antiparallel connections.

It is further assumed that each vehicle (see examples in FIG. 4) is controllable by an individual control signal, which may indicate a command from a finite set of predetermined commands. If the vehicles are autonomous, the control signal may be a machine-oriented signal which controls actuators in the vehicle; if the vehicles are conventional, the control signals may be human-intelligible signals directed to their drivers. It is understood that individual control signals may be multiplexed onto a common carrier. A predefined command may represent an action to be taken at the next waypoint (e.g., continue straight, continue right, continue left, stop), a next destination, a speed adjustment, a loading operation or the like. Implicit signaling is possible, in that a command has a different meaning depending on its current state (e.g., toggle between an electric engine and a combustion engine, toggle between high and low speed, drive/wait at the next waypoint). A vehicle which receives no control signal or a neutrally-valued control signal may be configured to continue the previously instructed action or to halt. The predetermined commands preferably relate to tactical decision-making, which corresponds to a time scale typically shorter than strategic decision-making and typically longer than operational (or machine-level) decision-making. Different vehicles may have different sets of commands.

One aim of the present disclosure is to enable efficient centralized control of the vehicles v1, v2, v3, v4. The vehicles v1, v2, v3, v4 are to be controlled as a group, with mutual coordination. The mutual coordination may entail that any resource-utilization conflicts that could arise between vehicles are deferred to a planning algorithm and resolved at the planning stage. The planning may aim to maximize productivity, such as the total quantity of useful transportation work (e.g., in relation to a transport mission) or the percentage of on-schedule deliveries of goods. The planning may additionally aim to minimize cost, including fuel consumption, battery wear, wear on mechanical components, and the like.

Regarding the resource utilization conflicts that may arise, it may initially be noted that if each vehicle moves one waypoint per epoch, then no vehicle blocks this movement of any other vehicle for the node occupancy (start state) shown in FIG. 3. The illustrated resource occupancy can be expressed as:

$$O \begin{pmatrix} v1 \\ v2 \\ v3 \\ v4 \end{pmatrix} = \begin{pmatrix} wp1 \\ wp4 \\ wp6 \\ wp8 \end{pmatrix}. \tag{1}$$

It can also be seen that this resource occupancy provides each vehicle with a next waypoint to which it can move in a next epoch. The choice is not arbitrary, however, as both vehicles v1 and v4 may theoretically move to waypoint wp3, but this conflict can be avoided by routing vehicle v1 to waypoint wp2 instead. If the system is evolved in the second manner, that is, $$O \begin{pmatrix} v1 \\ v2 \\ v3 \\ v4 \end{pmatrix} = \begin{pmatrix} wp2 \\ wp5 \\ wp7 \\ wp3 \end{pmatrix},$$

then vehicle v4 will block vehicle v1 from moving to the next waypoint wp3. This blocking state temporarily reduces the vehicle system's productivity but will be resolved once vehicle v4 continues to waypoint wp4.

It is easy to realize that the difficulty of the blocking states (as measured, say, by the number of vehicle movements needed to reach a non-blocking state) in a given waypoint topology will increase with the number of vehicles present. The efficiency gain of deploying marginally more vehicles to solve a given transport mission in a given environment may therefore be offset by the increased risk of conflicts. A waypoint topology populated with many vehicles may also have more deadlock states, i.e., states where no vehicle movement is possible. A deadlock state is a special case of a blocking state. It may correspond to a real-life scenario where the controlled vehicles need external help to resume operation, such as operator intervention, towing etc.

Figure 5:
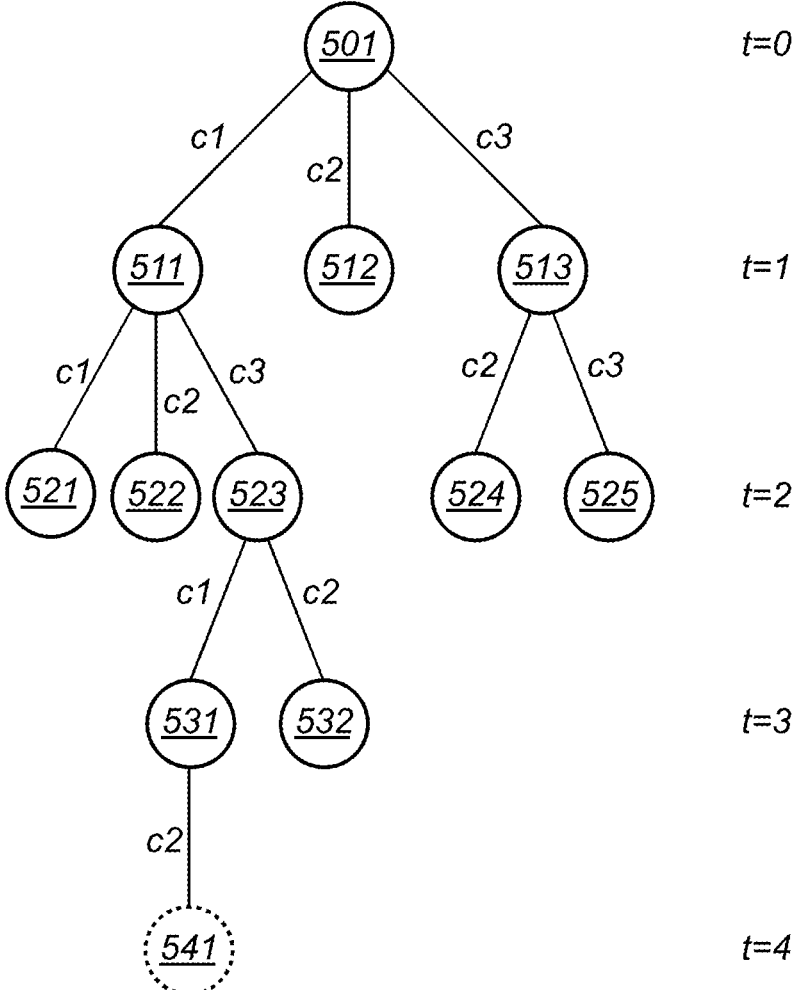
FIG. 5 illustrates a search tree in which each edge represents a motion command and each node represents a resource occupancy.

The following description is made under an assumption of discrete time, that is, the traffic system evolves in evenly spaced epochs, which can be identified by their serial number t=0, 1, 2, 3 . . . . FIG. 5 shows a search tree, in which each edge represents a motion command c1, c2, c3 and each node 501, 511, 512, . . . represents a resource occupancy. The levels of the search tree, which can be identified by their respective distance from the root node, correspond to consecutive epochs, as shown by the annotation on the right-hand side.

The duration of an epoch may be of the order of 0.1 s, 1 s, 10 s or longer. At each epoch, either a command is given to one of the vehicles v1, v2, v3, v4, a set of commands is given to a group of vehicles, or no command is given. In FIG. 5, the symbols c1, c2, c3 may refer to single commands or a set of commands. In practical implementations, it may be necessary to distribute multiple quasi-simultaneous commands v1.c1, v2.c1, which address multiple vehicles v1, v2 or vehicle groups, over two or more consecutive epochs; to allow such approximate simultaneity, the epoch length may be configured shorter than the typical time scale of the tactical decision-making for one vehicle.

The rule that a vehicle shall be allowed to move from a first resource to a second resource if the first resource is connected to the second resource and the second resource is not occupied eliminates a number of potential commands. As shown by the search tree in FIG. 5, while some resource occupancies (as defined by the corresponding nodes) allow the full selection of commands c1, c2, c3, other resource occupancies allow only a subset of these commands, or none at all. With this setup, the space of possible planning outcomes is at most equal to the set of all command sequences of length d, where d is the planning horizon (or lookahead horizon). The number of nodes in an unrestricted search tree—and hence the computational effort—grows exponentially with the length d. It is an aim of the present disclosure to propose ways to temper the growth of the search tree while still achieving planning outcomes that perform well. Tempering the growth of the search tree could mean, on the one hand, limiting the local branching factor and, on the other hand, relying on an early success indicator (long-term component) to stop the depth-wise growth into unfruitful directions.

Traffic Planning Method

Figure 1:
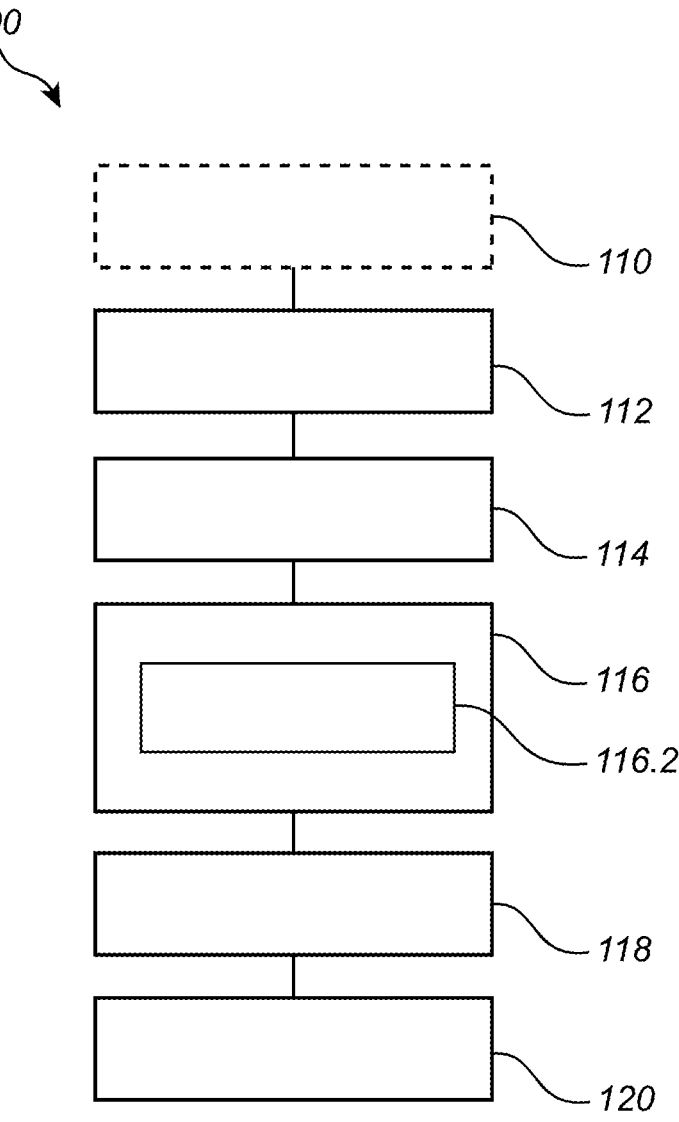
FIG. 1 is a flowchart of a traffic planning method.

With reference now to the flowchart in FIG. 1, a traffic planning method 100 according to an example embodiment will be described. The method 100 may be implemented by a general-purpose programmable computer, notably of a type corresponding to the computer system 200 which will be described below with reference to FIG. 2.

The method 100 is concerned with a plurality of vehicles which are movable among multiple shared resources in accordance with predefined motion commands, and subject to a rule that a vehicle is allowed to move from a first resource to a second resource if the first resource is connected to the second resource and the second resource is not occupied. In the running execution of the method 100, the input data includes an initial resource occupancy of the vehicles (see example in equation (1) above), and the output data includes a planned sequence of motion commands which can be executed by the vehicles. Further, the execution of the method 100 is responsive to additional data, including a transport mission to be carried out by the vehicles, a definition of the predefined motion commands and finally a node-wise score related to the vehicles' fulfilment of the transport mission. The various items of this additional data can be acquired or determined by the computer system 200 in any order. Normally the additional data need not be re-acquired or re-determined when a new execution cycle starts (i.e., from a new initial resource occupancy).

In one step 112 of the method 100, the transport mission to be carried out by the vehicles is acquired by the computer system 200. The transport mission may be received from an operator or a system owner, or another entity in whose interest the controlled vehicles operate. The transport mission may be an open mission, such as "keep moving items from a loading station to an unloading station", wherein the characteristics of the items (e.g., goods, objects, products) may be specified but not their total quantity. Although the progress of an open transport mission can be quantified (e.g., in terms of the number, mass or volume of the moved items), its execution generally speaking goes on without reaching any definite state of being completed. The method 100 can also be used for closed transport missions, such as "move the three items at the loading station to the unloading station", for which there is a well-defined final state, i.e., the three items are located at the unloading station. The open vs closed nature of the transport mission may sometimes be relevant for the definition of the score to be discussed below.

In a further step 114, which can be executed before or after step 112, or overlapping in time with step 112, a root node of a search tree is generated. The root node represents an initial resource occupancy of the vehicles. The initial resource occupancy may be obtained from a traffic control entity communicating with the vehicles, from sensors detecting the positions of the vehicles, or from a reply to a self-positioning query issued to the vehicles.

In a further step 116, and starting from the root node, a search tree is generated, in which each edge represents a motion command and each node represents a resource occupancy. The search tree may be represented as a data structure in a runtime memory of the computer system 200. FIG. 5 shows an example search tree, where the root node carries reference symbol 501, and the edges carry reference symbols c1, c2 or c3, which denote the corresponding motion command. It is appreciated that each node uniquely determines a resource occupancy; it can be found by executing motion commands from the root node to the node at issue. However, multiple nodes can determine identical resource occupancies, which is because a resource occupancy can in general be reached from an initial resource occupancy by two or more sequences of motion commands which achieve equivalent results.

The step 116 of generating the search tree further includes assigning a score to each newly generated node, wherein the score is related to the vehicles' fulfilment of the transport mission. The score of a node includes a short-term component, which represents a cost of executing all motion commands from the root node to said node, and a long-term component, which is determined by the resource occupancy that the node represents.

The short-term component may be computed on the basis of a cost lookup table, where each of the predefined motion commands is related to a respective cost. The cost may be an estimated value, a simulated value, or a measured value. To determine the short-term component, the relevant costs are read from the cost lookup table and summed over all epochs t=1, 2, 3, . . . . For example, the short-term component of node 541 can be computed as $$-C(c1)-C(c3)-C(c1)-C(c2),$$

where C(•) denotes a cost function read from the lookup table. It is recalled that the symbols c1, c2, c3 in the search tree may refer to sets or vectors of motion commands—directed to multiple vehicles or all vehicles—and the summation shall run over all vehicles concerned. Optionally, the score may further include a positively signed short-term component that represents the vehicles' fulfilment of the transport mission. This option is useful for transport missions of the open type (e.g., circulate the vehicles on a predefined road loop that includes a loading station and an unloading station), in which a vehicle entering a certain resource corresponds—almost certainly—to a unit of completed productive transportation work.

The long-term component may be computed as a function of the resource occupancy that the new node represents. The long-term component may be independent of the node's location in the search tree, i.e., it is independent of the sequence of motion that brought the vehicles to the corresponding resource occupancy. In particular, the function may be defined in tabular form, i.e., its values may be stored in a memory, such as a further lookup table or a trainable model (e.g., a feedforward neural network) which approximates the long-term component. Accordingly, in some implementations, the score of a newly generated node in the search tree is assigned 116.2 by reading a value of the long-term component from the memory.

Table 1 shows the scores in one example, where it is assumed that C(c3)=1 and C(c3)=2:

TABLE 1

| | Example scores of nodes in search tree | | |
|---|---|---|---|
| Node | Short-term component | Long-term component | Score |
| 524 | −3 | 3.1 | 0.1 |
| 525 | −4 | 5.4 | 1.4 |

It is seen that, although it is costlier to apply motion commands taking the vehicles into the state of the node 525, the long-term component reveals that the overall operation of the vehicles that state onwards is expected to be more rewarding. Accordingly, the long-term value acts a as a supervisor for the tree search.

In the search tree, new nodes may be added for as long as it is deemed meaningful or as configured by an operator or system owner. If it is desired to obtain a planned sequence of motion commands of length d, the search tree must include at least one node at depth d (epoch t=d). Preferably, to have reasonable certainty that the planned sequence of motion commands is close to an optimum, the search tree should include a plurality of such nodes. Alternatively, the search tree is extended until a predefined convergence criterion is met, e.g., that the score of the latest added node at depth d does not differ from a previous score by more than a predefined threshold.

Once the search tree is deemed complete, in a step 118, a target node with an acceptable score is identified among the nodes of the search tree. The target node may be the node with the maximal score of all nodes in the search tree. Alternatively, the target node may be a node whose score exceeds a predefined score threshold, in particular the first generated node whose score exceeds the score threshold. In one example, the steps 116 and 118 can be implemented with a Monte Carlo tree search (MCTS) as baseline. Example MCTS algorithms are disclosed in US20200363800A1.

To the identified target node, there is a unique path from the root node. From this path, it is possible to derive, in a step 120, a planned sequence of motion commands, which forms the output of the method 100.

To populate the memory with values of the long-term component—or equivalently, to train the model—a scoring phase 110 may be executed in which observed or simulated movements of the vehicles are evaluated. (The scoring phase 110 is optional since, as mentioned, the long-term component of a node may alternatively be directly computed as a function of the resource occupancy that the node represents.) At least a part of the scoring phase 110 should be completed before the further steps of the method 100 are executed, so that the long-term component is ready for use. In broad terms, the evaluation aims to determine for each resource occupancy the benefit or drawback that is to be expected when the operation of the vehicles continues from that resource occupancy. More precisely, the inventors have realized and confirmed experimentally that from the appearance of a current resource occupancy, it is possible to derive significant guidance for the decision whether to continue building the search tree from that resource occupancy onwards, and this is encoded as the long-term component.

Without departing from the scope of the present disclosure, there are a number of options for defining the long-term component of the score, which reflects an outcome of the evaluation of the movements of the vehicles. On the one hand, the movements of the vehicles may be evaluated with respect to fulfilment of the transport mission, e.g., a percentage to which a closed-type transport mission has been completed, a number/mass/volume of goods that has been transported within an open-type transport mission. As mentioned, the long-term component may reflect an expected benefit to be obtained. For this purpose, in some implementations, the long-term component may include an anticipated reward representing a future percentage increment or a future number/mass/volume increment. The anticipated reward may be equal to the future reward reduced by a discount function, such as a discount factor $0<\gamma<1$ raised to a power corresponding to the delay of the reward. In an example, if the movements of the vehicles will lead to fulfilment of the transport mission at node 541, then a reward of, say, 20 units is assigned to the node 541 (epoch t=4), an anticipated reward of $20\gamma$ is assigned to the node 531 (epoch t=3), an anticipated reward of $20\gamma^2$ is assigned to the node 523 (epoch t=2), an anticipated reward of $20\gamma^3$ is assigned to the node 511 (epoch t=1), and an anticipated reward of $20\gamma^4$ is assigned to the root node 501 (epoch t=0). In general, a reward R which is delayed by p epochs (i.e., it can be collected after p epochs), corresponds to an anticipated reward of $R \times \gamma^p$.

On the other hand, the movements may be evaluated with respect to a drawback or expected drawback of a particular resource occupancy. In one example, the battery energy levels of the vehicles can be included in the long-term component of the score. For the avoidance of doubt, the memory storing the long-term component is populated with the battery energy levels that the vehicles had in the scoring phase 110. If the scoring phase 110 is concerned with simulated vehicle movements, the battery energy level may be modelled as a linear or a nonlinear function of the energy drained from the battery; the nonlinear option may reflect the commonly observed fact that some batteries drain faster when the voltage is in the lower range. While it is not certain that these battery energy levels will coincide with those of the vehicle fleet that is to be controlled, they indicate the relative desirability of a particular resource occupancy and so—in accordance with the inventors' realization—provide valuable guidance to the tree search. This may help avoid planning outcomes where vehicles are sent to such locations where they are known to be at a high risk of running flat on battery, in particular remote or elevated locations. In another example, the movements of the vehicles are evaluated with respect to an expected total standstill time of the vehicles. In another example, the long-term component may be inversely related to the total standstill time as this generally indicates poor planning efficiency and/or congestion of a traffic system. A benefit may include that planning outcomes with significant standstill time are penalized and thus avoided by the traffic planning method.

It is noted that it may sometimes be possible to express the long-term component as a function of a single vehicle's position—or of the positions of a small number of vehicles—rather than the full resource occupancy. For a long-term component (inversely) related to the battery-energy level, it can be realized that if one vehicle is about to move into a remote or elevated area, where battery run-flat is likely (even regardless of the traffic-planning decisions that may be taken), it does not matter where the remaining vehicles are located.

The evaluated movements of the vehicles that are used in the scoring phase 110 may be simulated movements. The simulation may be a computer simulation, where the vehicles are advanced epoch by epoch in accordance with predefined rules (rule-based simulation) or at random, and preferably a plurality of such computer simulations carried out under slightly different conditions. The predefined rules may include a decision rule which each vehicle applies. For example, the vehicle may be assumed to continue along a predefined loop unless it encounters another vehicle, in which case it either waits or tries to make a detour around the other vehicle in accordance with predefined traffic rules. Further vehicle may apply a local-optimization rule, such as greedy decision-making aiming to obtain a reward for completing the transport mission but without consideration of the other vehicles, minimize the self-vehicle's standstill time, and/or minimize the self-vehicle's energy consumption.

Under the random option, sampling from a random distribution determines whether and which motion command will be applied to a vehicle in the next epoch. This may be considered to correspond to an uncoordinated control of the vehicles, which provides a fair idea of the desirability of the resource occupancy from which the movements begin. During the simulation, the value of the long-term score is computed for each new resource occupancy and is recorded together with the respective resource occupancy in a memory 210. If multiple values are obtained for the same resource occupancy, a statistical average, median or the like may be formed.

Alternatively, the evaluated movements of the vehicles that are used in the scoring phase 110 may be observed real-world vehicle movements. During the observation, the value of the long-term score is computed and is recorded together with the respective resource occupancy in a memory 210. Similarly, if multiple values are obtained for the same resource occupancy, a statistical average, median or the like may be formed.

Figure 2:
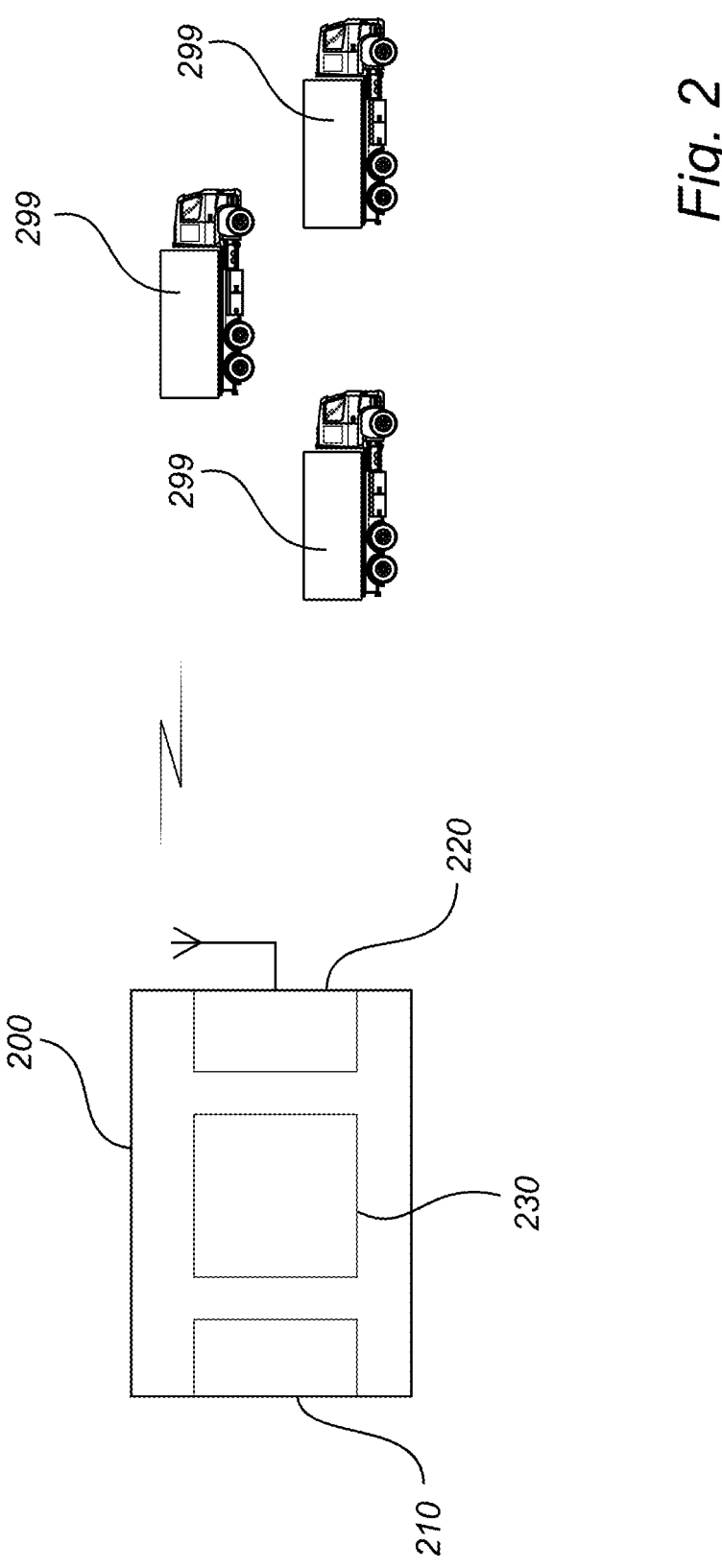
FIG. 2 shows an exemplary computer system suitable for controlling a plurality of vehicles.

FIG. 2 shows, in accordance with a further embodiment, a computer system 200 for controlling a plurality of vehicles 299 sharing a set of resources. The computer system 200 may be fixedly installed or carried in a vehicle 299. The computer system 200, which may alternatively be referred to as a traffic planner, has an interface 220 configured to receive an initial resource occupancy of the vehicles 299. Optionally, it may further receive, for each vehicle, information representing a set of predefined commands, which can be fed to the respective vehicles, and/or a transport mission (utility task) to be carried out by the vehicles 299. The initial resource occupancy may be obtained from a traffic control entity (not shown) communicating with the vehicles 299, from sensors (not shown) detecting the positions of the vehicles 299, or from a reply to a self-positioning query issued to the vehicles 299. The optional information may be entered into the interface 220 by an operator or provided as configuration data once it is known which vehicles 299 will form the fleet. The interface 220 of the computer system 200 is further configured to feed commands selected from said predefined commands to said plurality of vehicles, and especially the planned sequence of motion commands. FIG. 2 shows direct wireless links from the interface 220 to the vehicles 299. In other embodiments, as explained above, the interface 220 may instead feed sequences of the predefined commands to the traffic control entity, which takes care of the delivery of the commands to the vehicles 299.

The computer system 200 further comprises processing circuitry 230 configured to perform the method 100 described above. It may optionally include a memory 210 suitable for storing a lookup table relating resource occupancies to values of the long-term component of the score.

Figure 4:
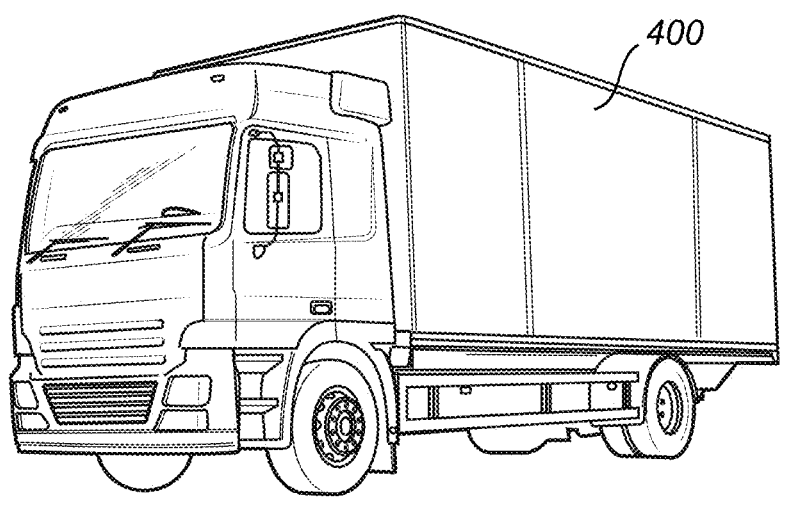
FIG. 4 shows example vehicles that can be controlled centrally using teachings from the present disclosure.
Figure 4:
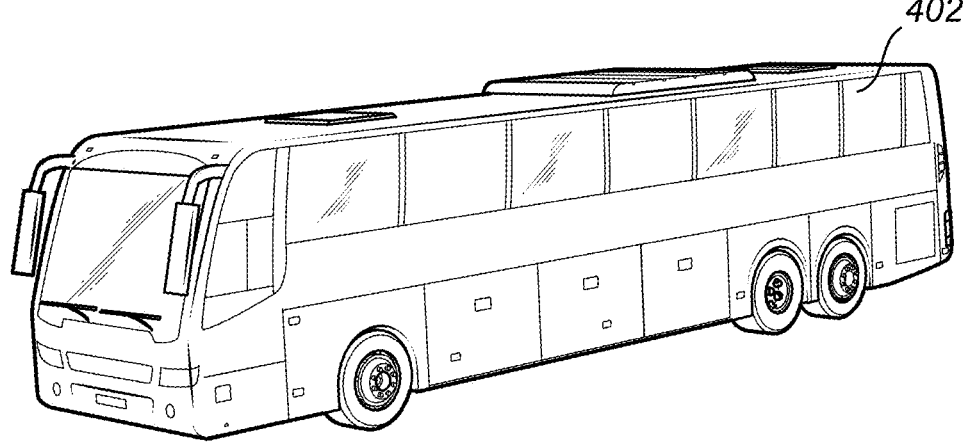
Figure 4:
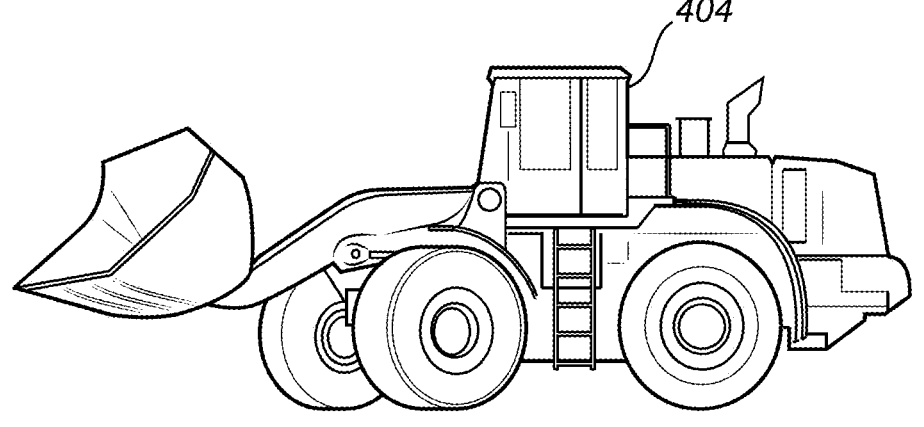

FIG. 4 shows a truck 400, a bus 402 and a construction equipment vehicle 404. A fleet of vehicles of one or more of these types, whether they are autonomous or conventional, can be controlled in a centralized fashion using the method 100 or the device 200 described above.

Remarks on the Computer System

Some additional remarks are of order concerning the schematic diagram of the computer system 200 for implementing examples disclosed herein. The computer system 200 is adapted to execute instructions from a computer-readable medium to perform these and/or any of the functions or processing described herein. The computer system 200 may be connected (e.g., networked) to other machines in a LAN, an intranet, an extranet, or the Internet. While only a single device is illustrated, the computer system 200 may include any collection of devices that individually or jointly execute a set (or multiple sets) of instructions to perform any one or more of the methodologies discussed herein. Accordingly, any reference in the disclosure and/or claims to a computer system, computing system, computer device, computing device, control system, control unit, electronic control unit (ECU), processor device, processing circuitry, etc., includes reference to one or more such devices to individually or jointly execute a set (or multiple sets) of instructions to perform any one or more of the methodologies discussed herein. For example, control system may include a single control unit or a plurality of control units connected or otherwise communicatively coupled to each other, such that any performed function may be distributed between the control units as desired. Further, such devices may communicate with each other or other devices by various system architectures, such as directly or via a Controller Area Network (CAN) bus, etc.

The computer system 200 may comprise at least one computing device or electronic device capable of including firmware, hardware, and/or executing software instructions to implement the functionality described herein. The computer system 200 may include processing circuitry 230 (e.g., processing circuitry including one or more processor devices or control units), a memory, and a system bus. The computer system 200 may include at least one computing device having the processing circuitry 230. The system bus provides an interface for system components including, but not limited to, the memory and the processing circuitry 230. The processing circuitry 230 may include any number of hardware components for conducting data or signal processing or for executing computer code stored in memory. The processing circuitry 230 may, for example, include a general-purpose processor, an application specific processor, a Digital Signal Processor (DSP), an Application Specific Integrated Circuit (ASIC), a Field Programmable Gate Array (FPGA), a circuit containing processing components, a group of distributed processing components, a group of distributed computers configured for processing, or other programmable logic device, discrete gate or transistor logic, discrete hardware components, or any combination thereof designed to perform the functions described herein. The processing circuitry 230 may further include computer executable code that controls operation of the programmable device.

The system bus may be any of several types of bus structures that may further interconnect to a memory bus (with or without a memory controller), a peripheral bus, and/or a local bus using any of a variety of bus architectures. The memory may be one or more devices for storing data and/or computer code for completing or facilitating methods described herein. The memory may include database components, object code components, script components, or other types of information structure for supporting the various activities herein. Any distributed or local memory device may be utilized with the systems and methods of this description. The memory may be communicably connected to the processing circuitry 230 (e.g., via a circuit or any other wired, wireless, or network connection) and may include computer code for executing one or more processes described herein. The memory may include non-volatile memory (e.g., read-only memory (ROM), erasable programmable read-only memory (EPROM), electrically erasable programmable read-only memory (EEPROM), etc.), and volatile memory (e.g., random-access memory (RAM)), or any other medium which can be used to carry or store desired program code in the form of machine-executable instructions or data structures and which can be accessed by a computer or other machine with processing circuitry. A basic input/output system (BIOS) may be stored in the non-volatile memory and can include the basic routines that help to transfer information between elements within the computer system 200.

The computer system 200 may further include or be coupled to a non-transitory computer-readable storage medium such as the storage device, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 200 and other drives associated with computer-readable media and computer-usable media may provide non-volatile storage of data, data structures, computer-executable instructions, and the like.

Computer-code which is hard or soft coded may be provided in the form of one or more modules. The module(s) can be implemented as software and/or hard-coded in circuitry to implement the functionality described herein in whole or in part. The modules may be stored in the storage device and/or in the volatile memory, which may include an operating system and/or one or more program modules. All or a portion of the examples disclosed herein may be implemented as a computer program stored on a transitory or non-transitory computer-usable or computer-readable storage medium (e.g., single medium or multiple media), such as the storage device, which includes complex programming instructions (e.g., complex computer-readable program code) to cause the processing circuitry 230 to carry out actions described herein. Thus, the computer-readable program code of the computer program can comprise software instructions for implementing the functionality of the examples described herein when executed by the processing circuitry 230. In some examples, the storage device may be a computer program product (e.g., readable storage medium) storing the computer program thereon, where at least a portion of a computer program may be loadable (e.g., into a processor) for implementing the functionality of the examples described herein when executed by the processing circuitry 230. The processing circuitry 230 may serve as a controller or control system for the computer system 200 that is to implement the functionality described herein.

The computer system 200 may include an input device interface configured to receive input and selections to be communicated to the computer system 200 when executing instructions, such as from a keyboard, mouse, touch-sensitive surface, etc. Such input devices may be connected to the processing circuitry 230 through the input device interface coupled to the system bus but can be connected through other interfaces, such as a parallel port, an Institute of Electrical and Electronic Engineers (IEEE) 1394 serial port, a Universal Serial Bus (USB) port, an IR interface, and the like. The computer system 200 may include an output device interface configured to forward output, such as to a display, a video display unit (e.g., a liquid crystal display (LCD) or a cathode ray tube (CRT)). The computer system 200 may include a communications interface 220 suitable for communicating with a network as appropriate or desired.

The operational actions described in any of the exemplary aspects herein are described to provide examples and discussion. The actions may be performed by hardware components, may be embodied in machine-executable instructions to cause a processor to perform the actions, or may be performed by a combination of hardware and software. Although a specific order of method actions may be shown or described, the order of the actions may differ. In addition, two or more actions may be performed concurrently or with partial concurrence.

Closing Remarks

The terminology used herein is for the purpose of describing particular aspects only and is not intended to be limiting of the disclosure. As used herein, the singular forms "a," "an," and "the" are intended to include the plural forms as well, unless the context clearly indicates otherwise. As used herein, the term "and/or" includes any and all combinations of one or more of the associated listed items. It will be further understood that the terms "comprises," "comprising," "includes," and/or "including" when used herein specify the presence of stated features, integers, actions, steps, operations, elements, and/or components, but do not preclude the presence or addition of one or more other features, integers, actions, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as "below" or "above" or "upper" or "lower" or "horizontal" or "vertical" may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

It is to be understood that the present disclosure is not limited to the aspects described above and illustrated in the drawings; rather, the skilled person will recognize that many changes and modifications may be made within the scope of the present disclosure and appended claims. In the drawings and specification, there have been disclosed aspects for purposes of illustration only and not for purposes of limitation, the scope of the disclosure being set forth in the following claims.

The invention claimed is:

1. A computer-implemented traffic planning method for controlling a plurality of vehicles which are movable among multiple shared resources in accordance with predefined motion commands, each resource representing space for transport or parking, a communication channel, maintenance machinery or additional equipment for optional temporary use, wherein a vehicle is allowed to move from a first resource to a second resource if the first resource is connected to the second resource and the second resource is not occupied, the method comprising the following steps to be performed by processing circuitry of a computer system:

receiving a transport mission to be carried out by the vehicles;

generating a root node representing an initial resource occupancy of the vehicles;

generating a search tree from the root node, in which each edge represents a motion command and each node represents a resource occupancy, wherein each node is associated with a score related to the vehicles' fulfilment of the transport mission, and a score is assigned to a newly generated node in the search tree by computing a value of the short-term component and reading a value of the long-term component from a memory;

identifying, among the nodes of the search tree, a target node with an acceptable score; and deriving a planned sequence of motion commands corresponding to a path from the root node to the target node, wherein the score of a node includes a short-term component, which represents a cost of executing all motion commands from the root node to said node, and a long-term component, which is determined by the resource occupancy that the node represents; and performing an initial scoring phase in which the memory is populated with values of the long-term component by evaluating movements of the vehicles with respect to expected battery energy levels of the vehicles.

2. The method of claim 1, wherein the evaluated movements of the vehicles are simulated movements.

3. The method of claim 2, wherein the simulated movements are random.

4. The method of claim 2, wherein the simulated movements are rule-based.

5. The method of claim 1, wherein the evaluated movements of the vehicles are observed real-world movements.

6. The method of claim 1, wherein the memory is a trainable model.

7. The method of claim 1, wherein the movements of the vehicles are evaluated with respect to fulfilment of the transport mission.

8. The method of claim 1, wherein the movements of the vehicles are evaluated with respect to an expected total standstill time of the vehicles.

9. The method of claim 1, wherein the score of a node further includes a short-term component that represents the vehicles' fulfilment of the transport mission.

10. The method of claim 1, wherein the acceptable score of the identified target node is a maximal score in the search tree and/or exceeds a predefined score threshold.

11. The method of claim 1, wherein the vehicles are autonomous vehicles.

12. A computer system comprising processing circuitry configured to control a plurality of vehicles, which are movable among multiple shared resources in accordance with predefined motion commands, each resource representing space for transport or parking, a communication channel, maintenance machinery or additional equipment for optional temporary use, wherein a vehicle is allowed to move from a first resource to a second resource if the first resource is connected to the second resource and the second resource is not occupied, the computer system being configured to:

receive a transport mission to be carried out by the vehicles;

generate a root node representing an initial resource occupancy of the vehicles;

generate a search tree from the root node, in which each edge represents a motion command and each node represents a resource occupancy, wherein each node is associated with a score related to the vehicles' fulfilment of the transport mission, and the generating of the search tree includes assigning a score to a newly generated node in the search tree by computing a value of the short-term component and reading a value of the long-term component from the memory;

identify, among the nodes of the search tree, a target node with an acceptable score; derive a planned sequence of motion commands corresponding to a path from the root node to the target node, wherein the score of a node includes a short-term component, which represents a cost of executing all motion commands from the root node to said node, and a long-term component, which is determined by the resource occupancy that the node represents; and perform an initial scoring phase in which the memory is populated with values of the long-term component by evaluating movements of the vehicles with respect to the vehicles' fulfilment of the transport mission.

13. The computer system of claim 12, wherein the memory is a trainable model.

14. A vehicle comprising the computer system of claim 12.

15. A non-transitory computer-readable storage medium comprising instructions which when executed by processing circuitry, cause the processing circuitry to perform the method of claim 1.

\* \* \* \* \*